United States Patent
Xu et al.

(10) Patent No.: US 9,943,933 B2
(45) Date of Patent: Apr. 17, 2018

(54) REPAIR OF GAS TURBINE ENGINE COMPONENTS

(71) Applicant: Rolls-Royce Corporation, Indianapolis, IN (US)

(72) Inventors: Raymond Ruiwen Xu, Carmel, IN (US); Jacque S. Bader, Martinsville, IN (US); Kong Ma, Carmel, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 463 days.

(21) Appl. No.: 14/135,091

(22) Filed: Dec. 19, 2013

(65) Prior Publication Data

US 2014/0259589 A1    Sep. 18, 2014

Related U.S. Application Data

(60) Provisional application No. 61/791,161, filed on Mar. 15, 2013.

(51) Int. Cl.
*B23P 6/00* (2006.01)
*B23K 26/03* (2006.01)
(Continued)

(52) U.S. Cl.
CPC ............ *B23P 6/007* (2013.01); *B23K 26/032* (2013.01); *F01D 5/005* (2013.01); *F01D 5/34* (2013.01);
(Continued)

(58) Field of Classification Search
CPC . B23P 6/007; F01D 5/005; F01D 5/34; Y10T 29/49178; B23K 26/032; B33Y 50/02
See application file for complete search history.

(56) References Cited

U.S. PATENT DOCUMENTS

| | | |
|---|---|---|
| 3,854,842 A | 12/1974 | Caudill |
| 4,073,599 A | 2/1978 | Allen et al. |

(Continued)

FOREIGN PATENT DOCUMENTS

| | | |
|---|---|---|
| EP | 1466718 A2 | 10/2004 |
| EP | 1674658 A1 | 6/2006 |

(Continued)

OTHER PUBLICATIONS

Song et al., "Control of melt pool temperature and deposition height during direct metal deposition process", May 2011, International Journal of Advanced Manufacturing Technology, vol. 58,pp. 247-256.*

(Continued)

*Primary Examiner* — Geoffrey S Evans
(74) *Attorney, Agent, or Firm* — Shumaker & Sieffert, P.A.

(57) ABSTRACT

In some examples, a technique includes delivering, using a material delivery device, material adjacent to a repair surface of a component and delivering, using a gas delivery device, a gas adjacent to the repair surface. The technique also may include delivering, from an energy source, energy to the material adjacent the repair surface to fuse the material to the repair surface; and receiving, by a computing device, at least one parameter indicative of at least one of a temperature or a geometry of the component. The technique may further include, responsive to the at least one parameter indicative of the at least one of the temperature or the geometry of the component, controlling, by the computing device, at least one processing parameter to control the temperature of the component.

17 Claims, 8 Drawing Sheets

(51) Int. Cl.
*F01D 5/00* (2006.01)
*F01D 5/34* (2006.01)
*B33Y 50/02* (2015.01)

(52) U.S. Cl.
CPC .......... *B33Y 50/02* (2014.12); *Y10T 29/49718* (2015.01)

(56) References Cited

U.S. PATENT DOCUMENTS

| | | | |
|---|---|---|---|
| 4,214,355 A | 7/1980 | Zelahy | |
| 4,232,995 A | 11/1980 | Stalker et al. | |
| 4,247,254 A | 1/1981 | Zelahy | |
| 4,390,320 A | 6/1983 | Eiswerth | |
| 4,411,597 A | 10/1983 | Koffel et al. | |
| 5,038,014 A | 8/1991 | Pratt et al. | |
| 5,183,385 A | 2/1993 | Lee et al. | |
| 5,479,704 A | 1/1996 | Richter et al. | |
| 5,554,837 A | 9/1996 | Goodwater et al. | |
| 6,122,564 A | 9/2000 | Koch et al. | |
| 6,146,476 A | 11/2000 | Boyer | |
| 6,172,327 B1 | 1/2001 | Aleshin et al. | |
| 6,269,540 B1 | 8/2001 | Islam et al. | |
| 6,326,585 B1 | 12/2001 | Aleshin et al. | |
| 6,459,951 B1* | 10/2002 | Griffith | B23K 26/032 156/64 |
| 6,478,537 B2 | 11/2002 | Junkin | |
| 6,502,303 B2 | 1/2003 | Updegrove et al. | |
| 6,553,275 B1* | 4/2003 | Mazumder | G01L 5/0047 700/118 |
| 6,588,103 B2 | 7/2003 | Fernihough et al. | |
| 6,811,379 B2 | 11/2004 | Fernihough et al. | |
| 7,001,151 B2 | 2/2006 | Wang et al. | |
| 7,278,829 B2 | 10/2007 | Roedl et al. | |
| 7,472,478 B2 | 1/2009 | Graham et al. | |
| 7,587,818 B2 | 9/2009 | Gorman et al. | |
| 7,600,977 B2 | 10/2009 | Shadbolt et al. | |
| 7,765,022 B2* | 7/2010 | Mazumder | B23K 26/032 219/121.61 |
| 7,784,668 B2 | 8/2010 | Shubert | |
| 7,984,547 B2 | 7/2011 | Steinhardt | |
| 8,049,132 B2 | 11/2011 | Bouet et al. | |
| 8,091,228 B2 | 1/2012 | Hiskes | |
| 8,096,030 B2 | 1/2012 | Graichen | |
| 8,376,211 B2 | 2/2013 | Rose | |
| 8,726,501 B2 | 5/2014 | Schoonover et al. | |
| 8,875,392 B2 | 11/2014 | Richter | |
| 8,996,156 B2 | 3/2015 | Melzer-Jokisch et al. | |
| 9,085,053 B2 | 7/2015 | Tholen et al. | |
| 9,085,980 B2 | 7/2015 | Mittendorf et al. | |
| 9,126,287 B2 | 9/2015 | Bruck et al. | |
| 2001/0002287 A1* | 5/2001 | Kar | B22F 3/1055 427/554 |
| 2003/0075836 A1* | 4/2003 | Fong | B29C 41/46 264/401 |
| 2004/0166187 A1* | 8/2004 | Fong | B29C 67/0092 425/130 |
| 2004/0200816 A1 | 10/2004 | Chung et al. | |
| 2005/0023256 A1* | 2/2005 | Sankaranarayanan | B23K 26/0823 219/121.63 |
| 2005/0040147 A1 | 2/2005 | Hoebel et al. | |
| 2005/0133527 A1* | 6/2005 | Dullea | B05B 7/14 222/1 |
| 2006/0032840 A1* | 2/2006 | Bagavath-Singh | B22F 3/1055 219/121.64 |
| 2006/0054079 A1 | 3/2006 | Withey et al. | |
| 2006/0193612 A1* | 8/2006 | Bouet | B23P 6/007 392/408 |
| 2007/0175875 A1* | 8/2007 | Uckelmann | A61C 13/0013 219/121.85 |
| 2008/0135530 A1 | 6/2008 | Lee et al. | |
| 2008/0173624 A1 | 7/2008 | Drechsler et al. | |
| 2008/0178994 A1* | 7/2008 | Qi | B22F 3/1055 156/245 |
| 2008/0201947 A1 | 8/2008 | Richter et al. | |
| 2008/0296270 A1* | 12/2008 | Song | B23K 26/03 219/121.63 |
| 2009/0001059 A1 | 1/2009 | Spallek et al. | |
| 2010/0170878 A1* | 7/2010 | Krause | B23K 26/34 219/74 |
| 2010/0176097 A1* | 7/2010 | Zhu | B23K 26/03 219/121.63 |
| 2010/0257733 A1 | 10/2010 | Guo et al. | |
| 2011/0069301 A1* | 3/2011 | Marzok | B22F 3/10 356/43 |
| 2011/0100964 A1* | 5/2011 | Burbaum | B23K 26/03 219/121.64 |
| 2011/0103967 A1 | 5/2011 | Hoebel et al. | |
| 2011/0150636 A1 | 6/2011 | Tholen et al. | |
| 2013/0104397 A1 | 5/2013 | Bunker | |
| 2013/0298400 A1 | 11/2013 | Munshi et al. | |
| 2014/0259589 A1 | 9/2014 | Xu et al. | |
| 2014/0339206 A1 | 11/2014 | Ott et al. | |
| 2015/0040364 A1 | 2/2015 | Ogasahara et al. | |
| 2015/0041025 A1* | 2/2015 | Wescott | B23K 9/042 148/538 |
| 2015/0048058 A1 | 2/2015 | Bruck et al. | |
| 2015/0079306 A1 | 3/2015 | Schoeneborn et al. | |
| 2015/0202717 A1 | 7/2015 | Bruck et al. | |

FOREIGN PATENT DOCUMENTS

| | | |
|---|---|---|
| EP | 1701004 A1 | 9/2006 |
| EP | 2014413 A1 | 1/2009 |
| EP | 2028342 A2 | 2/2009 |
| EP | 1880793 A2 | 1/2013 |
| EP | 2586562 A2 | 5/2013 |
| GB | 2453945 A | 4/2009 |
| WO | WO-92/08592 A1 * | 5/1992 |
| WO | WO-00/00921 * | 1/2000 |

OTHER PUBLICATIONS

Tang et al., "Melt Pool Temperature Control for Laser Metal Deposition Processes—Part 1: Online Temperature Control, Feb. 2010, Journal of Manufacturing Science and Engineering", vol. 132, pp. 011010-1 to 011010-9.*

Tang et al. "Variable Powder Flow Rate Control in Laser Metal Deposition Processes", University of Missouri-Rolla, Aug. 2007, pp. 22-48.*

International Search Report and Written Opinion for counterpart international application No. PCT/US2013/076670, dated Feb. 19, 2014, 8 pp.

International Preliminary Report on Patentability from counterpart International Application No. PCT/US2013/076670, dated Sep. 24, 2015, 6 pp.

Search Report from counterpart Singaporean Application No. 11201507650U, dated Sep. 13, 2016, 10 pp.

Response to Search Report and Written Opinion dated Sep. 13, 2016, from counterpart Singaporean Application No. 11201507650U, filed Feb. 1, 2017, 10 pp.

U.S. Appl. No. 15/423,181, by Brandon David Ribic et al., filed Feb. 2, 2017.

Notice of Eligibility for Grant dated Mar. 7, 2017, from counterpart Singaporean Application No. 11201507650U, 5 pp.

Examination Report from counterpart European Application No. 13819142.4, dated Jun. 14, 2017, 5 pp.

Response to Examination Report dated Jun. 14, 2017, from counterpart European Application No. 13819142.4, filed Oct. 6, 2017, 7 pp.

* cited by examiner

REPAIR OF GAS TURBINE ENGINE COMPONENTS

This application claims the benefit of U.S. Provisional Application No. 61/791,161, filed Mar. 15, 2013, which is incorporated herein by reference in its entirety.

TECHNICAL FIELD

The present disclosure generally relates to repair of gas turbine engine components.

BACKGROUND

Integrally bladed disks, which may be called blisks, are used in low-pressure compressor (LPC) and high-pressure compressor (HPC) stages of gas turbine engines. The blisks may weigh less and have lower leakage than separate blades and disks, allowing facilitating gas turbine engine efficiency. In some examples, multiple blisks may be metallurgically bonded or welded together to make blisk drums. Although this may further reduce component weight compared to separate blisks mechanically attached to each other, it increases manufacturing and repair costs.

SUMMARY

The disclosure describes systems and technique for repairing components, such as blisk airfoils, using material addition. In some examples, direct laser deposit (DLD) material addition (MA) may be used to deposit at least one layer of material on a component to restore a damaged portion of the component.

Metallurgy, including microstructure of the component, may influence properties of the component. Because of this, the repaired portion of the component (deposited by DLD MA) should have substantially similar metallurgical properties to those of the original portion of the component. In some examples, heat treatment and/or mechanical working (e.g., forging) are used to form the predetermined metallurgical properties in the original component. However, utilizing bulk heat treatment and/or mechanical working of the repaired component may add cost to the repair procedure and/or may negatively impact metallurgical properties of the remainder of the component.

In some examples, the disclosure describes techniques for real-time control of local heating and cooling of portions of the component during the DLD MA procedure. By controlling the local heating and cooling of portions of the component, the systems and techniques described herein may produce a predetermined microstructure. The predetermined microstructure may produce material mechanical and/or chemical properties that are substantially the same as the original portion of the component being repaired. For example, the microstructure may be substantially the same as the original portion of the component being repaired or may be a microstructure resulting in substantially the same material mechanical and/or chemical properties as the original portion of the component being repaired.

In some examples, the disclosure describes a method that includes delivering, using a material delivery device, material adjacent to a repair surface of a component; delivering, using a gas delivery device, a gas adjacent to the repair surface; delivering, from an energy source, energy to the material adjacent the repair surface to fuse the material to the repair surface; receiving, by a computing device, at least one parameter indicative of at least one of a temperature or a geometry of the component; and responsive to the at least one parameter indicative of the at least one of the temperature or the geometry of the component, controlling, by the computing device, at least one processing parameter to control the temperature of the component.

In some examples, the disclosure described a system that includes a material delivery device; a gas delivery device; an energy source; an energy delivery head; at least one sensor; and a computing device. In accordance with some of these examples, the computing device is configured to control the material delivery device to deliver material adjacent to a repair surface of a component; control the gas delivery device to deliver a gas adjacent to the repair surface; control the energy source and the energy delivery head to deliver energy to the material adjacent the repair surface to fuse the material to the repair surface; receive, from the at least one sensor, at least one parameter indicative of a temperature of the component; and control at least one processing parameter of the system to control the temperature of the component.

In some examples, the disclosure describes a computer-readable storage medium including instructions, that, when executed, cause at least one processor to control a material delivery device to deliver material adjacent to a repair surface of a component; control a gas delivery device to deliver gas adjacent to the repair surface of a component; control an energy source and an energy delivery head to deliver energy to the material adjacent the repair surface to fuse the material to the repair surface; receive, from at least one sensor, at least one parameter indicative of at least one of a temperature or a geometry of the component; and, responsive to the at least one parameter indicative of the at least one of the temperature or the geometry of the component, control at least one processing parameter of the system to control the temperature of the component.

The details of one or more examples are set forth in the accompanying drawings and the description below. Other features, objects, and advantages will be apparent from the description and drawings, and from the claims.

DETAILED DESCRIPTION

The disclosure describes systems and technique for repairing a component, such as blisk airfoils, using material addition. In some examples, direct laser deposit (DLD) material addition (MA) may be used to deposit at least one layer of material on a component to restore a damaged portion of the component. The component may have been damaged during use due to, for example, wear of the component against another component or foreign object damage.

Metallurgy, including microstructure of the component, may influence properties of the component. Because of this, the repaired portion of the component (deposited by DLD MA) should have a predetermined microstructure that produces material mechanical and/or chemical properties that are substantially the same as the original portion of the component being repaired. For example, the microstructure may be substantially the same as the original portion of the component being repaired or may be a microstructure resulting in substantially the same material mechanical and/or chemical properties as the original portion of the component being repaired. In some examples, heat treatment and/or mechanical working (e.g., forging) are used to form the predetermined metallurgical properties in the original component. However, utilizing bulk heat treatment and/or mechanical working of the repaired component may add cost to the repair procedure and/or may negatively impact metallurgical properties of the remainder of the component and/or may not be technically feasible.

In some examples, the disclosure describes techniques for real-time control of local heating and cooling of the component during the DLD MA procedure. By controlling the local heating and cooling of the component, the systems and techniques described herein may produce a predetermined microstructure (e.g., a microstructure substantially the same as the original portion of the component being repaired or a microstructure having the material mechanical and/or chemical properties substantially the same as the original portion of the component being repaired) during DLD MA.

In some examples, a system may include at least one sensor. The sensor may be configured to sense a parameter indicative of a temperature and/or a geometry of the component adjacent to the portion being repaired. For example, the sensor may be configured to sense a temperature and/or a size of a melt pool of the material being added to the component during the repair. In some examples, the at least one sensor may include a thermal camera and/or a visual camera. The thermal camera may be used to monitor a temperature of the component and/or the material being added to the component. The visual camera, such as a high resolution vision system and/or a laser vision sensor, may be used to monitor a geometry of the component, such as a geometry of a surface feature, geometry of a layer being added to the component, distortion of the geometry of the component, or the like.

The system also may include a computing device configured to control at least one operating parameter of the DLD MA procedure to control the temperature of the component being repaired and/or the material being added to the component. For example, the computing device may be configured to control at least one of a laser power level, a laser spot size, material delivery rate, a gas flow rate adjacent to the portion being repaired, relative movement between the component and the laser focal spot, a pause time between delivery of radiation using the laser, a standoff between the laser focal spot and the component, or the tool path. The tool path may include the width of the overlap between adjacent passes of the laser focal spot and the build-up rate.

Figure 1:
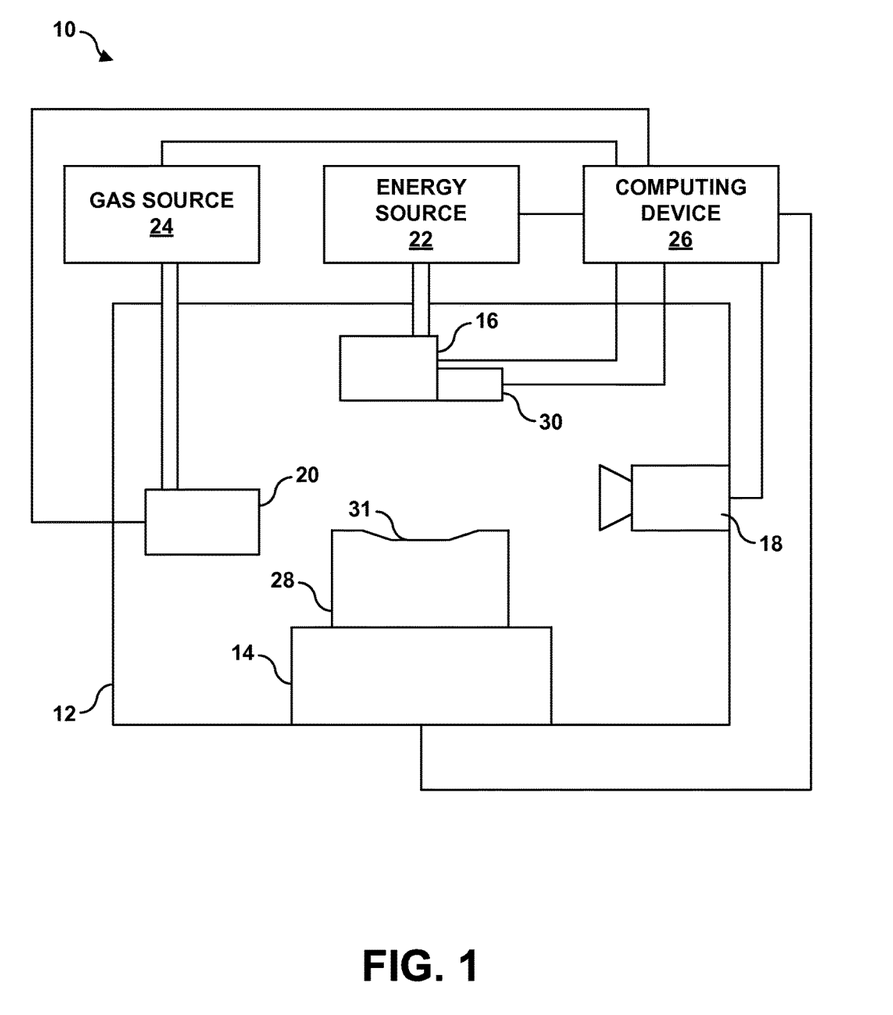
FIG. 1 is a conceptual block diagram illustrating an example system for repairing a damaged component using direct laser deposit (DLD) material addition (MA).

FIG. 1 is a conceptual diagram illustrating an example system 10 for repairing a damaged component using DLD MA. The example system 10 illustrated in FIG. 1 includes an enclosure 12, which encloses a stage 14, an energy delivery head 16, at least one sensor 18, a gas delivery device 20, and a material delivery device 30. System 10 also includes an energy source 22, which is operatively coupled to energy delivery head 16 and a gas source 24, which is fluidly connected to gas delivery device 20. In the example of FIG. 1, system 10 further includes a computing device 26, which is communicatively connected to energy source 22, gas source 24, gas delivery device 20, energy delivery head 16, at least one sensor 18, stage 14, and material delivery device 30.

Figure 2:
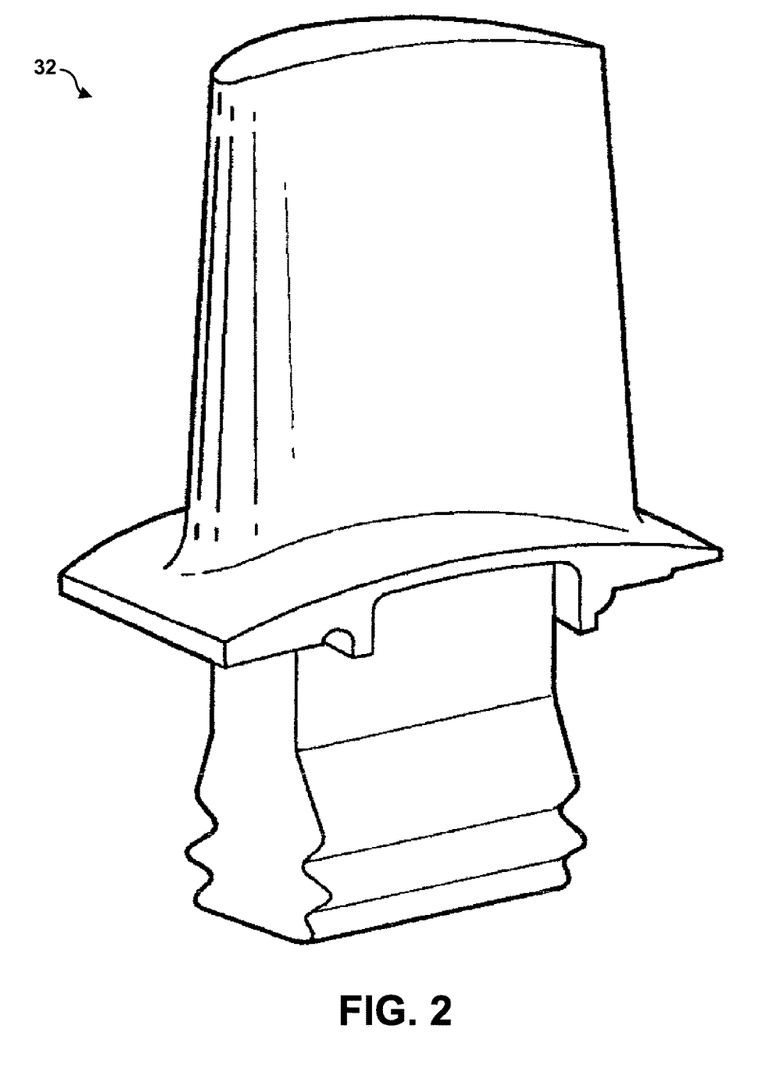
FIG. 2 is a conceptual diagram illustrating an example gas turbine blade.
Figure 3:
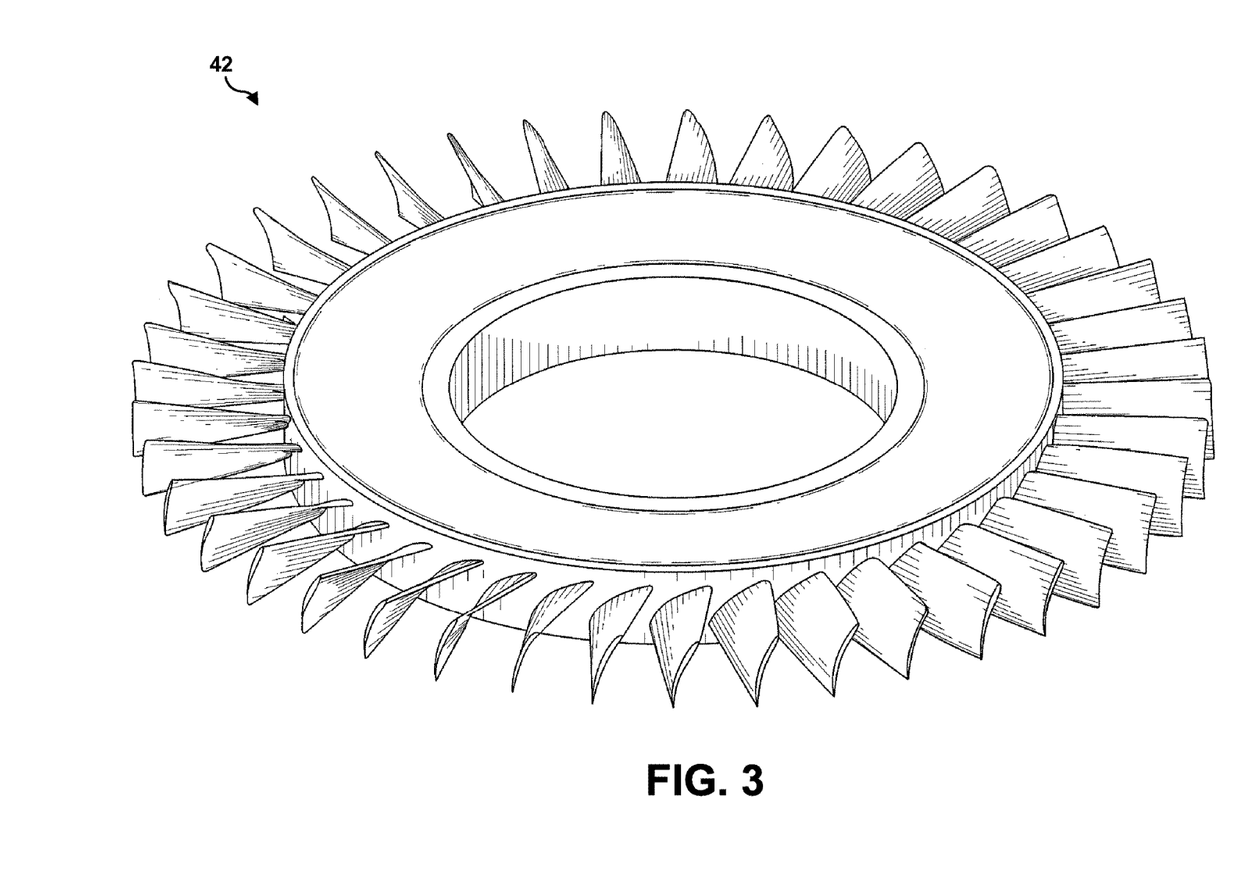
FIG. 3 is a schematic and conceptual diagram illustrating an example gas turbine blisk.

In some examples, component 28 may include a component of a gas turbine engine. For example, component 28 may include a part that forms a portion of a flow path structure or another portion of the gas turbine engine. For example, FIG. 2 is a conceptual diagram illustrating an example component 28, which is in the form of a turbine blade 32. In other examples, component 28 can take on a variety of other forms. As another example, FIG. 3 is a conceptual diagram illustrating an example component 28, which is in the form of a gas turbine engine blisk 42.

Figure 4:
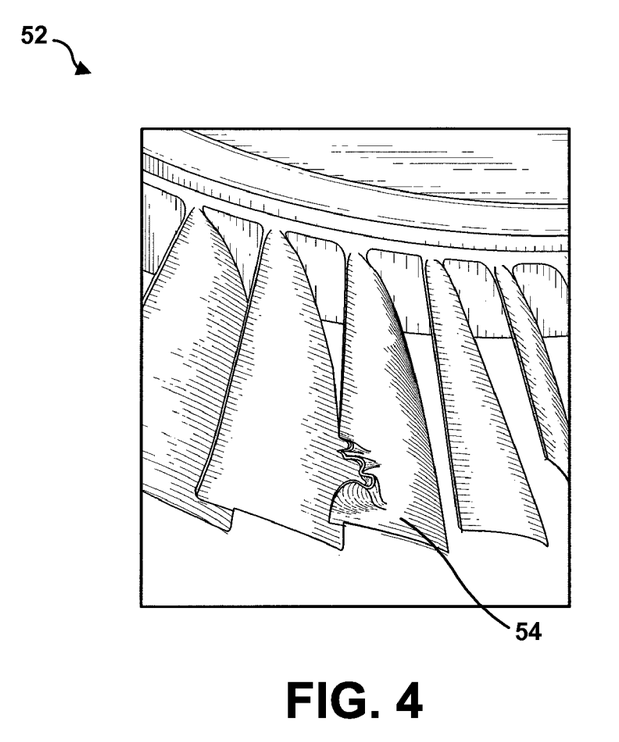
FIG. 4 is a schematic and conceptual diagram illustrating an example damaged blisk.

During some modes of operation, such as to produce power for a vehicle or while the component 28 is being manipulated for other purposes, component 28 may be damaged. FIG. 4 is a conceptual diagram illustrating a damaged airfoil 54 of a blisk 52. Such damage can be the result of an impact with a foreign object, fatigue over multiple operations, wear from repeated use, or the like. System 10 may be used to repair component 28 (e.g., turbine blade 32 or blisk 42) so component 28 can be returned to service. As shown in FIG. 1, component 28 defines a repair surface 31, which is a surface to which material is to be added to repair the damaged portion of component 28.

Component 28 may be formed of materials including metals and alloys, alone, or with one or more metallic, alloy, or ceramic coatings. In some examples, component 28 may include a titanium alloy or a nickel alloy. Example alloys include Ti-6Al-4V, Ti-6Al-2Sn-4Zr-2Mo, Ti-6Al-2Sn-4Zn-6Mo, and Inconel 718, an alloy including about (by mass) 50-55% Ni, about 17-21% Cr, about 2.8-3.3% Mo, about 4.75-5.5% Nb, about 1% Co, about 0.35% Mn, about 0.2-0.8% Cu, about 0.65-1.15% Al, about 0.3% Ti, about 0.35% Si, about 0.08% C, about 0.015% S, about 0.015% P, about 0.006% B, and a balance Fe.

Returning to FIG. 1, enclosure 12 may substantially enclose (e.g., enclose or nearly enclose) stage 14, energy delivery head 16, at least one sensor 18, gas delivery device 20, component 28, and material delivery device 30. In some examples, enclosure 12 may contain a substantially inert atmosphere (e.g., helium, argon, or the like) during operation of system 10 and repair of component 28.

In some examples, stage 14 may be configured to selectively position and restrain component 28 in place relative to stage 14 during repair of component 28. In some examples, stage 14 is movable relative to energy delivery head 16, gas delivery device 20, at least one sensor 18, and/or material delivery device 30. For example, stage 14 may be translatable and/or rotatable along at least one axis (e.g., using a 5 axis motion system) to position component 28 relative to energy delivery head 16, gas delivery device 20, and/or at least one sensor 18. Similarly, in some examples, at least one of energy delivery head 16, gas delivery device 20, and/or at least one sensor 18 may be movable relative to stage 14 to position the at least one of energy delivery head 16, gas delivery device 20, and/or at least one sensor 18 relative to component 28. In some examples, as illustrated in FIG. 1, energy delivery head 16 may be coupled (e.g., mechanically attached) to material delivery device 30, such that positioning energy delivery head 16 relative to stage 14 also positions material delivery device 30 relative to stage 14.

At least one sensor 18 may be configured to detect at least one parameter indicative of the status of component 28 during repair of component. For example, at least one sensor 18 may include a thermal camera, e.g., an imaging device sensitive to infrared radiation (an IR camera). A thermal camera may be used to detect the temperature of component 28, including the portion of component 28 being repaired and portions proximate to the portion being repaired. In some examples, the thermal camera may be a relatively high speed camera capable of capturing image data at a rate of tens or hundreds of frames per second or more, which may facilitate real-time detection of the temperature of component 28.

As another example, at least one sensor 18 may include a camera sensitive to visible radiation. The visual camera, such as a high resolution vision system and/or a laser vision sensor, may be used to monitor a geometry of component 28, such as a geometry of a surface feature of component 28, a layer geometry of a layer being added to component 28, of distortion of the geometry of component 28, or the like. In some examples, the visual camera may be a relatively high speed camera capable of capturing image data at a rate of tens or hundreds of frames per second or more, which may facilitate real-time detection of the geometry of component 28 and the melt pool during repair of component 28.

In some examples, at least one sensor 18 may include two or more sensors. For example, a first sensor may be positioned relative to component 28 such that the first sensor is oriented above the portion of component 28 being repaired to monitor the temperature and/or geometry of the melt pool. A second sensor may be positioned relative to component 28 such that the second sensor is oriented to the side of the portion of component 28 being repaired to monitor the temperature and/or geometry of component 28.

Energy source 22 may include a laser source, such as a CO laser, a CO2 laser, a Nd:YAG laser, or the like. Energy source 22 may be selected to provide energy with a predetermined wavelength or wavelength spectrum that may be absorbed by the material to be added to component 28 during DVD MA repair of component 28. Energy source 22 may be operatively connected to energy delivery head 16, which aims the energy toward component 28 during repair of component 28. As described above, in some examples, energy delivery head 16 may be movable in at least one dimension (e.g., translatable and/or rotatable) under control of computing device 26 to direct the energy toward a selected location of component 28.

In some examples, energy delivery head 16 may define a relatively small size in at least one dimension. In some examples, component 28 may be relatively small and/or may define a complex shape with relatively small spacing between adjacent structures. For example, a gas turbine blisk may include a plurality of blades with a spacing of less than 1.0 inch (2.54 cm). Hence, in some examples, the energy delivery head 16 may be sufficiently small to allow head 16 to be positioned to direct energy toward portions of a component 28 that is small or that has structural features that result in small working spaces between the structural features.

System 10 also includes gas source 24. Gas source 24 may include, for example, a source of helium, argon, or other substantially inert gas. In some examples, the gas may function as a cooling gas, which cools a portion of component 28 by flowing past the portion of component 28. As used herein, a substantially inert gas may include a gas that does not react with component 28 or the material being added to component 28 during the DVD MA repair process. Gas source 24 is fluidically coupled to gas delivery device 20. Although FIG. 1 illustrates system 10 including a single gas delivery device 20, in other examples, system 10 may include at least one gas delivery device 20, such as a plurality of gas delivery devices. Gas source 24 may be fluidically coupled to gas delivery device 20 using a tube, pipe, conduit, or the like, that allows fluid communication between gas source 24 and gas delivery device 20.

As described above, in some examples, gas delivery device 20 may be movable relative to component 28 under control of computing device 26. This may allow computing device 26 to control delivery of gas to a selected portion of component 28 to achieve controlled cooling of the selected portion of component 28. In examples in which system 10 includes a plurality of gas delivery device 20, each outlet 20 may be independently controllable by computing device 26 to independently cool selected portions of component 28.

In some examples, system 10 also may include a material delivery device 30. Material delivery device 30 may be configured to deliver material to the location of component 28 being repaired. The material then may be heated by energy delivered by energy delivery head 16 to add the material to component 28. In some examples, the material may be supplied by material delivery device 30 in powder form or wire form. In some examples, the material to be delivered to material delivery device 30 may include a composition substantially the same as (e.g., the same or nearly the same as) the composition of the material from which the damaged portion of component 28 was formed. In other examples, the material to be delivered to material delivery device 30 may include a composition different from the composition of the material from which the damaged portion of component 28 was formed.

As illustrated in FIG. 1, in some examples, material delivery device 30 may be mechanically attached to or integrated into energy delivery head 16. In some examples, this may facilitate coordinated positioning of energy delivery head 16 relative to the location at which material is delivered. In other examples, material delivery device 30 may be separate from energy delivery head 16.

Computing device 26 may include, for example, a desktop computer, a laptop computer, a workstation, a server, a mainframe, a cloud computing system, or the like. Computing device 26 is configured to control operation of system 10, including, for example, stage 14, at least one sensor 18, gas delivery device 20, gas source 24, energy source 22, energy delivery head 16, and/or material delivery device 16. Computing device 26 may be communicatively coupled to at least one of stage 14, at least one sensor 18, gas delivery device 20, gas source 24, energy source 22, energy delivery head 16, and/or material delivery device 16 using respective communication connections. In some examples, the communication connections may include network links, such as Ethernet, ATM, or other network connections. Such connections may be wireless and/or wired connections. In other examples, the communication connections may include other types of device connections, such as USB, IEEE 1394, or the like.

Computing device 26 may be configured to control operation of stage 14, at least one sensor 18, energy delivery head 16, and/or gas delivery device 20 to position component 28 relative to at least one sensor 18, energy delivery head 16, and/or gas delivery device 20. For example, as described above, computing device 26 may control stage 14 at least one sensor 18, energy delivery head 16, and/or gas delivery device 20 to translate and/or rotate along at least one axis to position component 28 relative to at least one sensor 18, energy delivery head 16, and/or gas delivery device 20. Positioning component 28 relative to at least one sensor 18, energy delivery head 16, and/or gas delivery device 20 may include positioning a predetermined surface (e.g., a surface to which material is to be added) of component 28 in a predetermined orientation relative to at least one sensor 18, energy delivery head 16, and/or gas delivery device 20.

Figure 5:
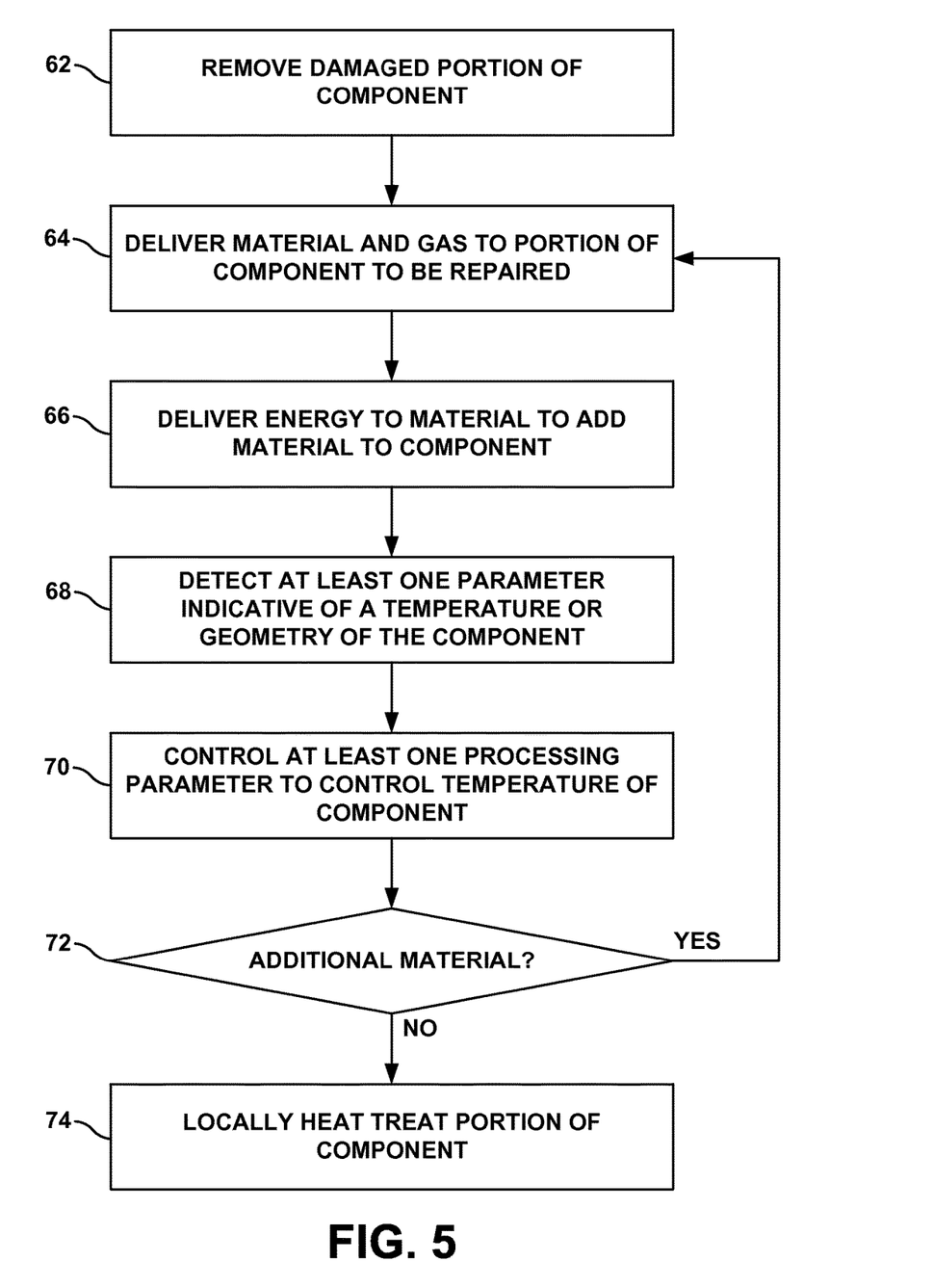
FIG. 5 is a flow diagram illustrating an example technique for repairing a damaged component using direct laser deposit (DLD) material addition (MA).

In accordance with some examples of this disclosure, computing device 26 may be configured to control system 10 to perform repair of a damaged portion of component 28 using DLD MA. FIG. 5 is a flow diagram illustrating an example technique for repairing component 28 using DLD MA. Although the technique of FIG. 5 will be described with respect to system 10 of FIG. 1, in other examples, the technique of FIG. 5 may be performed using a different system. Additionally, system 10 and computing device 26 may perform other techniques to repair component 28 using DLD MA.

In some examples, the technique of FIG. 5 optionally includes removing a damaged portion of component 28 (72). In some examples, component 28 may be damaged to the extent that component 28 requires addition of material to place component 28 back into service (e.g., within a gas turbine engine). In some examples, the damage may be caused by impact with a foreign object during service in the gas turbine engine. In other examples, the damage may be due to wear of component 28 against another component of the gas turbine engine, which may cause the dimensions of component 28 to not match the original dimensions present at the beginning of the service life of component 28.

Figure 6A:
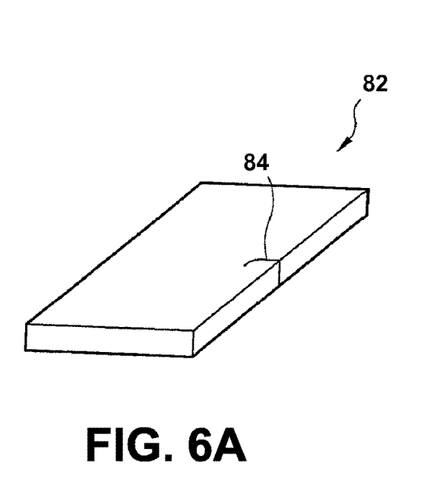
FIG. 6A is a schematic and conceptual diagram illustrating an example damaged component.
Figure 6B:
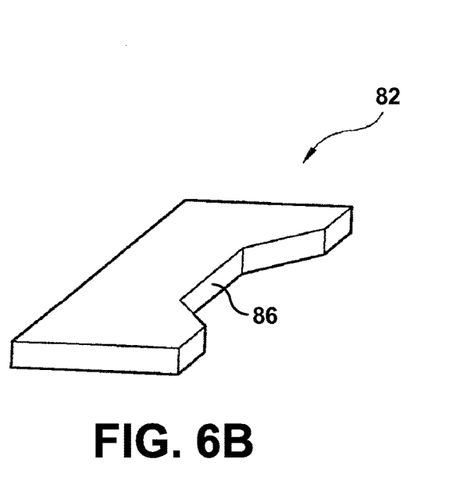
FIG. 6B is a conceptual diagram illustrating the example component of FIG. 4A with the damaged portion removed from the component.

In some examples in which the damage was caused by impact of a foreign object, the damage to component 28 may be sufficiently severe that a portion of 28 may be removed prior to the material addition process. FIGS. 6A and 6B are schematic and conceptual diagrams illustrating an example component 82 including a damaged portion 74 and the damaged portion removed from component 72. FIG. 6A depicts damaged portion 84 as a crack 84 to component 82, but it will be appreciated that other types of damage could also occur, such as a bent blade resulting from a foreign object damage (FOD) event.

As shown in FIG. 6B, in some examples, damaged portion 84 including the crack may be removed from component 82, creating a workpiece illustrated in FIG. 6B. The removed portion can take a variety of shapes and sizes which may be influenced by the particular type of component, its expected service environment, and ease of repair, among other possible considerations. As shown in FIG. 6B, component 82 defines a repair surface 86, to which material is added to repair component 82.

In some examples, system 10 may be used to remove the damaged portion 84 of component 82. For example, system 10 may include one or more devices operable to remove damage portion 84 by way of physical removal process such as mechanical machining, grinding, cutting, electrical discharge machining, chemical etching, or the like. In other examples, energy source 22 may generate energy sufficient to ablate or cut component 82 to remove damaged portion 84. In other examples, the damaged portion 84 may not be removed prior to the DLD MA process.

Although not shown in FIG. 5, in some examples, the technique may include pre-heat treating component 28. Component 28 may be pre-heat treated using energy delivered from energy source 22 by energy delivery head 16 or using another heat source, such as an infrared heat source, a furnace, or the like. The pre-heat treating may be local to a selected portion of component 28 or may be applied to all of component 28.

The technique of FIG. 5 also includes delivering, under control of computing device 26, material and gas to the portion of component 28 to be repaired, e.g., repair surface 31 (64). As described, above, computing device 26 may control material delivery device 30 and/or stage 14 to position material delivery device 30 relative to component 28 in a predetermined orientation to deliver the material to the location of component 28 to be repaired. In some examples, material delivery device 30 may deliver the material in powder form, wire form, or the like. For example, material in powder form may be blown by material delivery device 30 to deliver the material adjacent to the portion of component 28 to be repaired. Initially, material delivery device 30 may be positioned and configured to deliver material adjacent to the repair surface (e.g., repair surface 31 shown in FIG. 1 or repair surface 86 shown in FIG. 6B). Computing device 26 also may control the rate at which material is delivered by material delivery device 30 adjacent to component 28.

Computing device 26 also may control gas source 24 and gas delivery device 20 to delivery gas adjacent to repair surface 31 of component 28. The gas may include a substantially inert gas, such as argon or helium, which may provide a substantially inert gaseous atmosphere around the material addition location.

The composition of the material may be based upon the composition of component 28, and, more particularly, the composition of the portion of component 28 being repaired. Example materials includes titanium alloys, such as, Ti-6Al-4V, Ti-6Al-2Sn-4Zr-2Mo, Ti-6Al-2Sn-4Zn-6Mo, and nickel alloys such as Inconel 718, an alloy including about (by mass) 50-55% Ni, about 17-21% Cr, about 2.8-3.3% Mo, about 4.75-5.5% Nb, about 1% Co, about 0.35% Mn, about 0.2-0.8% Cu, about 0.65-1.15% Al, about 0.3% Ti, about 0.35% Si, about 0.08% C, about 0.015% S, about 0.015% P, about 0.006% B, and a balance Fe.

The technique of FIG. 5 also includes delivering, under control of computing device 26, energy to the material to add the material to component 28 (66). For example, computing device 26 may control energy source 22 to deliver energy via energy delivery head 16 to a position adjacent to repair surface 31 of component 28. The energy may cause the material to fuse to repair surface 31 of component 28. For example, the energy may partially or fully melt the material to fuse the material to repair surface 31 of component 28.

Computing device 26 may control at least one of the power level of energy source 22, the focal spot size of the energy beam delivered adjacent to repair surface 31 of component 28, the relative movement of the focal spot of the energy beam relative to component 28, a pause time between bursts of energy, the standoff between the focal point and repair surface 31 of component 28, or tool path. The tool path may include the width of the overlap between adjacent passes of the laser focal spot and the build-up rate. Computing device 26 may control the at least one of these parameters to control the amount of material added to component 28 at a given time and/or to control metallurgical properties of the added material. In some examples, energy delivery head 16 may be scanned (e.g., translated) relative to repair surface 31 of component 28 being repaired to scan the focal spot relative to repair surface 31 of component 28 being repaired, and the material may be fused in a general shape corresponding to the scanned path of the focal spot.

As energy is being delivered by energy source 22 (66), computing device 26 may detect at least one parameter indicative of at least one of a temperature or a geometry of at least a portion of component 28 using at least one sensor 18 (68). As described above, at least one sensor 18 may include a thermal camera and/or a visual camera. The thermal camera may detect a temperature of at least a portion of component 28 (e.g., the portion to which material is being added) based on infrared radiation emitted by the at least a portion of component 28. The visual camera may monitor the geometry of component 28 and/or a shape of a melt pool formed by delivery of energy by energy source 22 and energy delivery head 16, among other characteristics described above.

The geometry of component 28 and the shape of the melt pool may also be indicative of a temperature of the at least a portion of component 28. For example, the techniques used herein may be used to add material to an airfoil that defines relatively small geometries, such as a thickness of about 0.015 inch (about 381 micrometers) at a trailing edge. Because of the thinness of the airfoil, excessive temperatures may quickly melt the airfoil. Hence, visual melting may indicate excessive temperature.

Computing device 26 may be configured to receive signals from the at least one sensor 18 indicative of at least one of the temperature or the geometry of the at least a portion of component 28 and control at least one processing parameter to control (e.g., raise, lower, or substantially maintain) the temperature of the at least a portion of component 28 (70). For example, responsive to receiving a signal indicating that the temperature of the at least a portion of component 28 is higher than a predetermined temperature, computing device 26 may control at least one processing parameter to reduce the temperature of the at least a portion of component 28 to at or below the predetermined temperature. As another example, responsive to receiving a signal indicating that the geometry of a portion of component 28 is distorting, computing device 26 may control at least one processing parameter to reduce the temperature of the at least a portion of component 28 to at or below the predetermined temperature.

The processing parameters may include, for example, the power level of energy source 22, the focal spot size of the energy beam delivered adjacent to repair surface 31 of component 28, the relative movement of the focal spot of the energy beam relative to component 28, a rate at which material is delivered by material delivery device 30, a pause time between bursts of energy, the standoff between the focal point and repair surface 31 of component 28, or tool path. In some examples, computing device 26 may cause the temperature of the at least a portion of component 28 to be reduced by at least one of reducing the power level of energy source 22, increasing the focal spot size of the energy beam delivered adjacent to repair surface 31 of component 28 (thus reducing the power density), increasing the relative movement of the focal spot of the energy beam relative to component 28 (thus reducing the residence time of the focal spot at a given location), increasing a pause time between bursts of energy, increasing the standoff between the focal point and repair surface 31 of component 28 (thus reducing the overlap), or modifying tool path. Conversely, computing device 26 may cause the temperature of the at least a portion of component 28 to be increased by at least one of increasing the power level of energy source 22, reducing the focal spot size of the energy beam delivered adjacent to repair surface 31 of component 28 (thus increasing the power density), reducing the relative movement of the focal spot of the energy beam relative to component 28 (thus increasing the residence time of the focal spot at a given location), reducing a pause time between bursts of energy, reducing the standoff between the focal point and repair surface 31 of component 28 (thus reducing the overlap), or modifying tool path.

In some examples, computing device 26 may additionally or alternatively control delivery of a gas from cooling gas source 24 via gas delivery device 20. For example, computing device 26 may control a flow rate of gas, a position of gas delivery device 20 relative to component 28, or the like, to control cooling of the at least a portion of component 28. Computing device 26 may increase a flow rate of gas to decrease a temperature of the at least a portion of component 28, change a position of gas delivery device 20 relative to component 28 to decrease a temperature of the at least a portion of component 28, or the like, to decrease the temperature of the at least a portion of component 28.

Computing device 26 may be configured to control the temperature of the at least a portion of component 28 to control geometry and/or metallurgical properties of the repaired portion of component 28. For example, by controlling the temperature of the at least a portion of component 28, computing device 26 may be configured to facilitate reproduction of the original shape of component 28 as component 28 is being repaired. For example, by controlling a size of the melt pool (by controlling the temperature of component 28 proximate to the melt pool), computing device 26 may be configured to control the shape of the material added to component 28, and, thus, the shape of the repaired component 28. This may facilitate repair of components 28 with complex shapes and/or relatively small geometry. For example, an airfoil may define a cross-sectional shape that changes between about 0.120 inch (about 3.048 millimeters) and about 0.015 inch (about 0.381 millimeters) along the cross-section. Controlling the temperature of the at least a portion of component 28 may allow computing device 26 to deposit material in a geometry that substantially reproduces (e.g., reproduces or nearly reproduces) the originally manufactured cross-sectional shape of the component 28.

As another example, by controlling the temperature of at least a portion of component 28, computing device 26 may be configured to control metallurgical properties of the repaired portion of component 28. For example, computing device 26 may be configured to control of the temperature of the at least a portion of component 28 to control a heat treatment process of the at least a portion of component 28, which may affect the microstructure of the at least a portion of component 28. Computing device 26 may be configured to control of the temperature of the at least a portion of component 28 to control a heat treatment process of the at least a portion of component 28 to substantially reproduce (e.g., reproduce or nearly reproduce) the originally manufactured mechanical and/or chemical properties of component 28 by producing a predetermined microstructure. For example, the microstructure may be substantially the same as the original portion of the component being repaired or may be a microstructure resulting in substantially the same material mechanical and/or chemical properties as the original portion of the component being repaired.

In some examples, computing device 26 may be configured to locally control the temperature of component 28. For example, computing device 26 may receive data from at least one sensor 28 indicative of a local temperature of a portion of component 28 (e.g., a portion of material recently added to component 28) and may be configured to adjust heat input to the portion of component 28 (by controlling at least one processing parameter related to energy source 22 and energy delivery head 16) and/or cooling rate of the portion of component 28 (by controlling at least one processing parameter related gas source 24 and gas delivery device 20, e.g., the location of component 28 at which gas delivery device 20 is aimed and/or the flow rate of gas).

Computing device 26 may be configured to control the temperature of the at least a portion of component 28 automatically, e.g., based upon at least one algorithm executed by computing device 26 without operator intervention. In some examples, computing device 26 may be configured to control the temperature of the at least a portion of component 28 substantially throughout the material addition technique, e.g., before, during, and after material addition to component 28. In this way, computing device 26 may be configured to control the shape and/or metallurgical properties of the added material.

The technique of FIG. 5 also includes determining whether additional material is to be added to component 28 (72). Responsive to determining that additional material is to be added (the "YES" branch of decision block 72), computing device 26 may be configured to cause material delivery device 30 to deliver additional material (64), cause energy source 22 and energy delivery head 16 to delivery energy to the material to add material to component 28 (66), detect at least one parameter indicative of temperature of component 28 using at least one sensor 18 (68), and control at least one processing parameter to control the temperature of at least a portion of component 28 (70).

Figure 7:
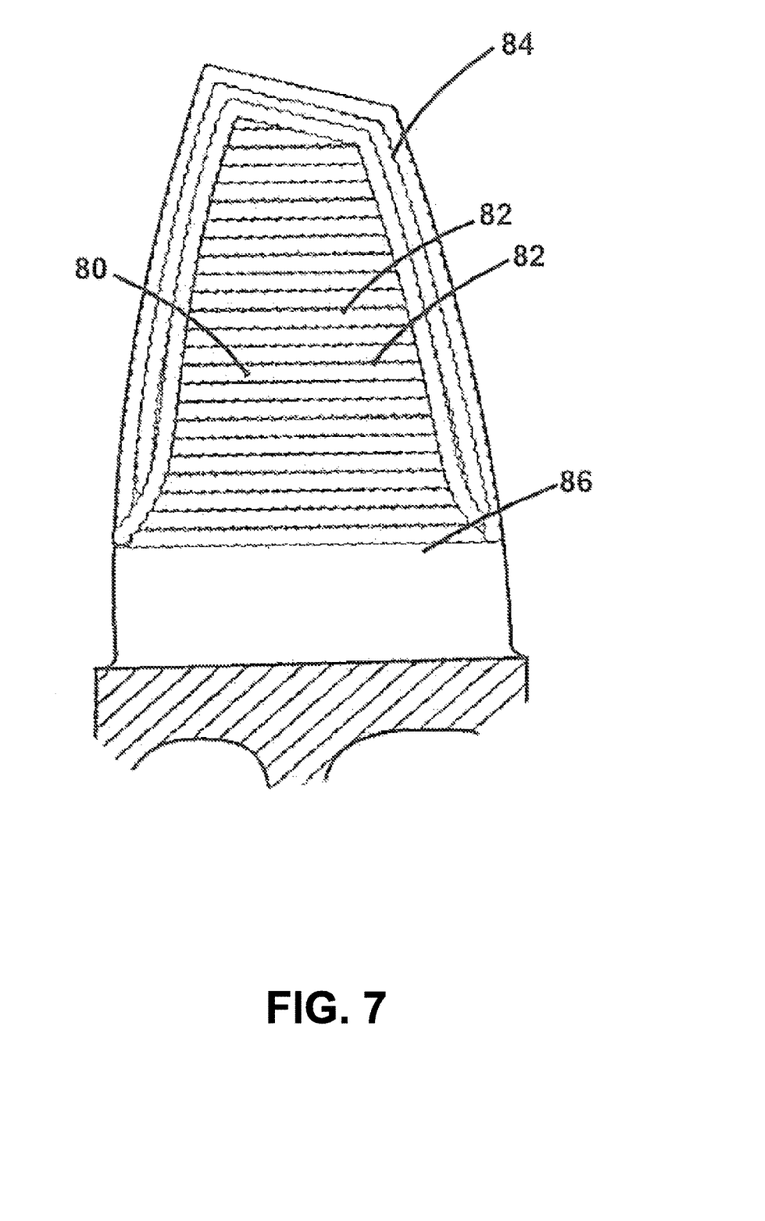
FIG. 7 is a conceptual diagram illustrating a gas turbine engine component.

As described above, computing device 26 may cause energy delivery head 16 to scan a focal spot along or adjacent to a surface of component 28 to which material is to be added as energy source 22 is outputting energy (e.g., repair surface 31 and/or a surface of material already added to component 28). Throughout the technique illustrated in FIG. 5, computing device 26 may cause energy delivery head 16 to scan the focal spot sequentially along different paths to create layers of added material. FIG. 7 is a conceptual diagram illustrating an example gas turbine engine component 80 with example layers formed by material addition. Gas turbine engine component 80 is illustrated as including a number of layers 82, 84 of material added in the volume formerly occupied by a portion removed the component 80 (e.g., a damaged portion of component 80). The material added to the volume can result in a net shape component 80, or near net shape component 80. Any number of material layers 82, 84 can be added whether greater in number or fewer than the number of layers 82, 84 depicted in FIG. 7.

Each of layers 82, 84 of the material can be created using the technique of FIG. 5, including delivering additional material using material delivery device 30 (64), delivering energy to the material to add material to component 28 using energy source 22 and energy delivery head 16 (66), detecting at least one parameter indicative of temperature of component 28 using at least one sensor 18 (68), and controlling at least one processing parameter to control the temperature of at least a portion of component 28 (70). In some examples, each of layers 82, 84 can be formed by scanning energy delivery head 16 along a predetermined path to scan the focal spot along a predetermined path generally corresponding to a respective layer of layers 82, 84. A single layer may be formed by multiple, sequential scannings of energy delivery head 16. In some examples, sequential scannings of the scanned laser can all be in the same direction having a similar starting side and ending side. In some examples, not all layers include multiple, sequential scannings, but may instead be formed by a single scanning of energy delivery head 16. Any variation of scanning patterns of energy delivery head 16 is contemplated herein to create any given layer 82, 84 of the material addition.

In some examples, a scanning path of energy delivery head 16 for forming a first layer of layers 82, 84 is different than the scanning path of energy delivery head 16 for forming a second layer of layers 82, 84. For example, a first layer of layers 82 closest to the base 86 of component 80 can be formed using paths for energy delivery device 16 that are all aligned in the same general direction, while a second layer of layers 82 above the first layer may be formed using paths for energy delivery device 16 aligned in the opposite direction. Furthermore, any scanned path in one layer can have the same or opposite direction as an adjacent scanned path in an adjacent layer.

As the example of FIG. 7 illustrates, a number of layers 82 are arranged parallel with a base 86 of component 80 and are built up over base 86 in the span direction. Layers 82 form a main body of component 80 and do not extend to the leading edge, the trailing edge, or the tip of component 80. Instead, layers 84 that form the leading edge, a trailing edge, and tip of component 80 generally follow in parallel with the edge defined by the leading edge, trailing edge, and tip, respectively. Any number of layers 84 parallel with the leading edge, a trailing edge, and tip can be used. Furthermore, the layers 84 that characterize the leading edge, a trailing edge, and tip can be equal in number as shown in the illustrated example, or the number of layers 84 in each of those regions can be different.

In some examples, the layers of layers 84 that define up the leading edge region of the component 80 can be formed prior to one or more layers in the tip and/or trailing edge regions. The same is true of either the tip or the trailing edge region. In other examples, one or more layers of the leading edge can be formed first, and prior to completion of the leading edge, one or more layers of the tip and/or trailing edge regions can also be formed. The same is also true of the tip and the trailing edge region.

As the example of FIG. 7 illustrates, a number of layers 82 are arranged parallel with a base 86 of component 80 and are built up over base 86 in the span direction. In some examples, rather than including layers 84 that define the leading edge, the trailing edge, and the tip of component 80, layers 82 may extend to the leading edge, the trailing edge, and/or the tip of component 80.

In this way, the material addition technique illustrated in FIG. 5 may be used to form a plurality of layers to repair a volume of a component 28 (FIG. 1) that has been damaged. During the formation of each layer during the material addition technique, computing device 26 may be configured to control the temperature and/or cooling rate of at least a portion of component 28. In some examples, computing device 26 may be configured to locally control the temperature and/or cooling rate of the at least a portion of component 28 and/or a plurality of portions of component 28. By controlling the temperature and/or cooling rate of portions of component 28, computing device 26 may be configured to control the geometry and/or metallurgical properties of the repaired portion of component 28. In some examples, as described above, computing device 26 may be configured to control the material addition to result in a net shape or a near net shape of component 28 (e.g., a shape that is the same as or nearly the same as the originally manufactured shape of component 28). Because computing device 26 may be configured to control local temperatures of component 28 during the material addition process in real time or near real time (e.g., based on data received from at least one sensor 18), computing device 26 may facilitate material addition repair of components including relatively fine or complex geometry, such as gas turbine blades.

Returning to FIG. 5, once computing device 26 determines that no additional material is to be added to component 28 (the "NO" branch of decision block (72)), for example, because component 28 including the added material defines a net or near net shape, computing device 26 may optionally be configured to locally heat treat at least a portion of component 28 (74). The portion of the component 28 subjected to the local heat treatment may include, for example, the repaired portion of component 28 formed by material addition.

For example, computing device 26 may be configured to control energy source 22 and energy delivery head 16 to heat a selected portion of component 28 to a selected temperature for a selected time to control metallurgy (e.g., microstructure) of the selected portion. As another example, computing device 26 may be configured to control gas source 24 and gas delivery device 20, alone or in combination with energy source 22 and energy delivery head 16, to cool a selected portion of component 28 at a selected rate to control metallurgy (e.g., microstructure) of the selected portion. In some examples, computing device 26 may be configured to locally heat treat a plurality of portions of component 28.

Figure 8:
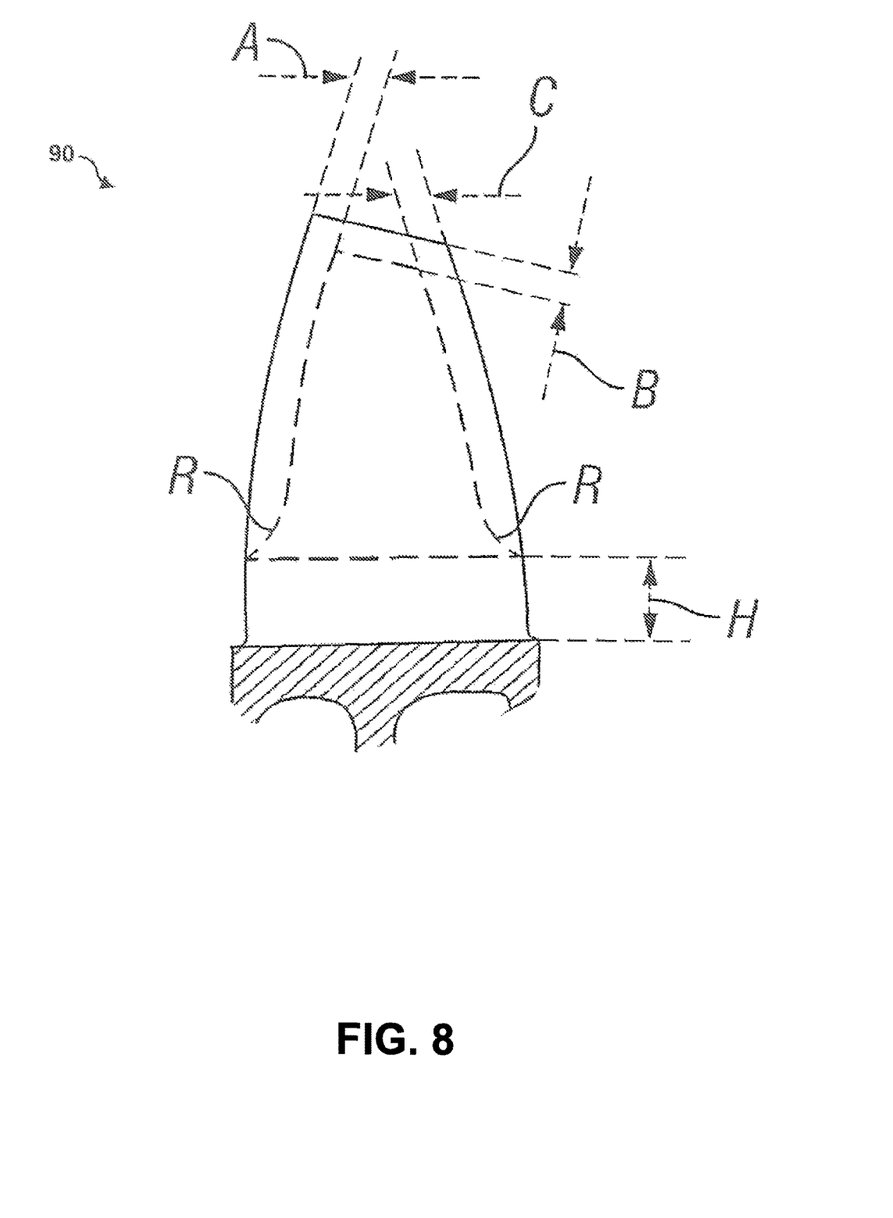
FIG. 8 is a conceptual diagram illustrating another example a gas turbine engine component.

The technique illustrated in FIG. 5 may be used to repair any portion of a metallic or alloy component using material addition. In some examples, the technique illustrated in FIG. 5 may be used to repair a gas turbine engine blade. In some examples, the gas turbine engine blade may be an integral part of a gas turbine engine blisk and/or a blisk drum. FIG. 8 is a conceptual diagram illustrating another example a gas turbine engine component, a gas turbine engine blade 90. FIG. 8 illustrates a number of dashed line markings indicating various portion of gas turbine engine blade 90 that may be repaired using the material addition technique illustrated in FIG. 5. In some examples, the technique of FIG. 5 may be used to repair at least a portion of the tip of gas turbine engine blade 90, indicated by dashed lines B. In some examples, the technique of FIG. 5 may be used to repair at least a portion of the leading edge of gas turbine engine blade 90, indicated by dashed lines A. In some examples, the technique of FIG. 5 may be used to repair at least a portion of the trailing edge of gas turbine engine blade 90, indicated by dashed lines C. In some examples, the technique of FIG. 5 may be used to repair at least a portion of the core of gas turbine engine blade 90, indicated by the area between dashed lines A, B, C, and H. Dashed line H indicates the keep-out zone.

In some examples, the technique illustrated in FIG. 5 may be used to repair at least a portion of more than one zone of gas turbine engine blade 90. For example, the technique illustrated in FIG. 5 may be used to repair at least a portion of the trailing edge, leading edge, and tip of gas turbine engine blade 90, such as substantially all of the trailing edge, leading edge, and tip. In some examples, the technique illustrated in FIG. 5 may be used to repair at least a portion of the core, trailing edge, leading edge, and tip of gas turbine engine blade 90, such as substantially all of the core, trailing edge, leading edge, and tip (e.g., substantially all of gas turbine engine blade 90 above the keep out zone indicated by dashed line H). In some examples, the technique illustrated in FIG. 5 may be used to repair at least a portion of the upper half of gas turbine engine blade 90, including portions of the core, leading edge, trailing edge, and tip that form the upper half of gas turbine engine blade 90.

In some examples, the technique illustrated in FIG. 5 may be used to perform a multiple step repair of gas turbine engine blade 90. For example, the technique of FIG. 5 may be used to first form the blade core using multiple material addition layers, without forming the leading edge or the trailing edge. The technique of FIG. 5 then may be used to form the trailing edge, leading edge, and tip using multiple material addition layers. As another example, the technique of FIG. 5 may be used to first form the top half of the blade core using multiple material addition layers, without forming the leading edge or the trailing edge. The technique of FIG. 5 then may be used to form the top portions of the trailing edge, the top portions of the leading edge, and the tip using multiple material addition layers.

In one or more examples, the functions described herein may be implemented in hardware, software, firmware, or any combination thereof. If implemented in software, the functions may be stored on or transmitted over, as one or more instructions or code, a computer-readable medium or computer-readable storage device and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media or computer-readable storage device, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, include compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   delivering, using a material delivery device, material adjacent to a repair surface of a component, wherein the repair surface is a surface of the component to which material is being added;
   delivering, using a cooling gas delivery device, a cooling gas adjacent to the repair surface;
   delivering, from an energy source, energy to the material adjacent the repair surface to fuse the material to the repair surface;
   receiving, by a computing device, at least one parameter indicative of a distortion of a geometry of the component to which material is being added; and
   responsive to the at least one parameter indicative of the distortion of the geometry of the component to which material is being added, controlling, by the computing device, at least one processing parameter to control the temperature of the portion of the component to which material is being added.

2. The method of claim 1, further comprising detecting, by at least one sensor, the at least one parameter indicative of the distortion of the geometry of the component to which material is being added.

3. The method of claim 1, wherein the at least one sensor comprises a visual camera.

4. The method of claim 1, wherein controlling the at least one processing parameter to control the temperature of the portion of the component to which material is being added comprises controlling, by the computing device, at least one of a power level of the energy source, a focal spot size of an energy beam delivered adjacent to the repair surface, material delivery rate, relative movement of a focal spot of the energy beam relative to the component, a pause time between bursts of energy, a standoff between the focal spot and the repair surface, or a tool path followed by an energy delivery head.

5. The method of claim 1, wherein controlling the at least one processing parameter to control the temperature of the portion of the component to which material is being added comprises controlling, by the computing device, at least one of a flow rate of cooling gas adjacent to the component or a position of the cooling gas delivery device relative to the component.

6. The method of claim 1, wherein the component comprises at least one of a gas turbine engine blade, a gas turbine engine blisk, or a gas turbine engine blisk drum.

7. The method of claim 1, further comprising removing a damaged portion of the component to define the repair surface.

8. A system comprising:
   a material delivery device;
   a cooling gas delivery device;
   an energy source;
   an energy delivery head;
   at least one sensor; and
   a computing device, wherein the computing device is configured to:
      control the material delivery device to deliver material adjacent to a repair surface of a component, wherein the repair surface is a surface of the component to which material is being added;
      control the gas delivery device to deliver a gas adjacent to the repair surface;
      control the energy source and the energy delivery head to deliver energy to the material adjacent the repair surface to fuse the material to the repair surface;
      receive, from the at least one sensor, at least one parameter indicative of a distortion of a geometry of the component to which material is being added; and
      responsive to the at least one parameter indicative of the distortion of the geometry of the component to which material is being added, control at least one processing parameter of the system to control the temperature of the portion of the component to which material is being added.

9. The system of claim 8, wherein the at least one sensor comprises a visual camera.

10. The system of claim 8, wherein the at least one processing parameter comprises at least one of a power level of the energy source, a focal spot size of an energy beam delivered adjacent to the repair surface, a material delivery rate, relative movement of a focal spot of the energy beam relative to the component, a pause time between bursts of energy, a standoff between the focal spot and the repair surface, or a tool path followed by an energy delivery head.

11. The system of claim 8, wherein the at least one processing parameter comprises at least one of a flow rate of cooling gas adjacent to the component or a position of the cooling gas delivery device relative to the component.

12. The system of claim 8, wherein the component comprises at least one of a gas turbine engine blade, a gas turbine engine blisk, or a gas turbine engine blisk drum.

13. A non-transitory computer-readable storage medium comprising instructions that, when executed, cause at least one processor to:
   control a material delivery device to deliver material adjacent to a repair surface of a component, wherein the repair surface is a surface of the component to which material is being added;
   control a cooling gas delivery device to deliver cooling gas adjacent to the repair surface of a component;
   control an energy source and an energy delivery head to deliver energy to the material adjacent the repair surface to fuse the material to the repair surface;
   receive, from at least one sensor, at least one parameter indicative of a distortion of a geometry of the component to which material is being added; and
   responsive to the at least one parameter indicative of the distortion of the geometry of the component to which material is being added, control at least one processing parameter of the system to control the temperature of the portion of the component to which material is being added.

14. The non-transitory computer-readable storage medium of claim 13, wherein the at least one sensor comprises a visual camera.

15. The non-transitory computer-readable storage medium of claim 13, wherein the at least one processing parameter comprises at least one of a power level of the energy source, a focal spot size of an energy beam delivered adjacent to the repair surface, a material delivery rate, relative movement of a focal spot of the energy beam relative to the component, a pause time between bursts of energy, a standoff between the focal spot and the repair surface, or a tool path followed by an energy delivery head.

16. The non-transitory computer-readable storage medium of claim 13, wherein the at least one processing parameter comprises at least one of a flow rate of cooling gas adjacent to the component or a position of the cooling gas delivery device relative to the component.

17. The non-transitory computer-readable storage medium of claim 13, wherein the component comprises at least one of a gas turbine engine blade, a gas turbine engine blisk, or a gas turbine engine blisk drum.

* * * * *